(12) United States Patent
Taira

(10) Patent No.: US 10,870,205 B2
(45) Date of Patent: Dec. 22, 2020

(54) ROBOT SYSTEM

(71) Applicant: Fanuc Corporation, Yamanashi (JP)

(72) Inventor: Yuuji Taira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 37 days.

(21) Appl. No.: 16/101,638

(22) Filed: Aug. 13, 2018

(65) Prior Publication Data

US 2019/0091868 A1     Mar. 28, 2019

(30) Foreign Application Priority Data

Sep. 27, 2017   (JP) .................................. 2017-185688

(51) Int. Cl.
*B25J 9/00*     (2006.01)
*B25J 9/16*     (2006.01)

(52) U.S. Cl.
CPC ........... *B25J 9/1697* (2013.01); *B25J 9/1612* (2013.01); *B25J 9/1669* (2013.01)

(58) Field of Classification Search
CPC ...... B25J 9/1697; B25J 9/1612; B25J 9/1669; B25J 9/0009; B25J 13/08
See application file for complete search history.

(56) References Cited

U.S. PATENT DOCUMENTS

| | | |
|---|---|---|
| 6,681,151 B1 | 1/2004 | Weinzimmer et al. |
| 2006/0104790 A1 | 5/2006 | Inoue et al. |
| 2008/0258402 A1* | 10/2008 | Tamura ................ B25J 19/0075 277/345 |
| 2009/0200432 A1 | 8/2009 | Inoue et al. |
| 2010/0264174 A1 | 10/2010 | Anderson, Jr. |
| 2012/0321426 A1* | 12/2012 | Tanaka .............. H01L 21/67766 414/728 |

(Continued)

FOREIGN PATENT DOCUMENTS

| | | |
|---|---|---|
| CN | 102837316 A | 12/2012 |
| CN | 103561917 A | 2/2014 |

(Continued)

OTHER PUBLICATIONS

Usui, Takumi; Notice of Reasons for Refusal for Japanese Application No. 2017-185688; dated Jul. 23, 2019; 2 pages.

(Continued)

*Primary Examiner* — Ian Jen
(74) *Attorney, Agent, or Firm* — Shackelford, Bowen, McKinley & Norton, LLP

(57) ABSTRACT

A robot system includes workpiece phase detection units that detects a phase of a workpiece around an axis in a substantially vertical direction; a robot including a hand that holds the workpiece, and a wrist capable of rotating the hand around a rotation axis in the substantially vertical direction; and a control unit that controls the robot, wherein the control unit controls the robot based on the phase of the workpiece detected by the workpiece phase detection units, in such a way that the workpiece is held and picked by the hand in a reference phase, among a plurality of predetermined reference phases, closest to a current relative phase of the hand and the workpiece and the phase of the workpiece is aligned with a predetermined target phase by rotation of the wrist.

4 Claims, 5 Drawing Sheets

(56) References Cited

U.S. PATENT DOCUMENTS

| | | | | |
|---|---|---|---|---|
| 2012/0323357 | A1* | 12/2012 | Izumi | G05B 19/4182 700/228 |
| 2012/0323363 | A1* | 12/2012 | Izumi | G05B 19/4182 700/248 |
| 2013/0211593 | A1* | 8/2013 | Domae | B25J 9/1612 700/258 |
| 2014/0025204 | A1* | 1/2014 | Schlaich | B25J 9/1676 700/255 |
| 2014/0028040 | A1* | 1/2014 | Oda | B25J 15/083 294/115 |
| 2014/0074292 | A1 | 3/2014 | Sawada | |
| 2014/0195053 | A1* | 7/2014 | Subotincic | B25J 9/1612 700/259 |
| 2014/0294541 | A1* | 10/2014 | Kaino | H01L 21/67736 414/217 |
| 2015/0003678 | A1* | 1/2015 | Watanabe | B25J 9/1697 382/103 |
| 2015/0251320 | A1* | 9/2015 | Ueno | B25J 15/0616 414/737 |
| 2016/0055425 | A1 | 2/2016 | Minami | |
| 2016/0136809 | A1 | 5/2016 | Subotincic | |
| 2016/0184992 | A1* | 6/2016 | Naderer | B25J 9/1687 700/218 |
| 2016/0236352 | A1 | 8/2016 | Sawada | |
| 2017/0028550 | A1* | 2/2017 | Terada | B25J 9/1656 |
| 2017/0139407 | A1 | 5/2017 | Sakaguchi et al. | |
| 2017/0154430 | A1* | 6/2017 | Yoshii | G06K 9/3233 |
| 2017/0210572 | A1 | 7/2017 | Alberti et al. | |
| 2017/0236262 | A1* | 8/2017 | Ohnuki | G06T 7/74 700/30 |
| 2018/0015617 | A1 | 1/2018 | Sawada | |
| 2019/0366555 | A1 | 12/2019 | Sawada | |

FOREIGN PATENT DOCUMENTS

| | | |
|---|---|---|
| EP | 1602459 A1 | 12/2005 |
| EP | 2537644 A1 | 12/2012 |
| EP | 2537645 A1 | 12/2012 |
| EP | 2586575 A1 | 5/2013 |
| EP | 2586576 A1 | 5/2013 |
| EP | 3171236 A1 | 5/2017 |
| EP | 3199479 A1 | 8/2017 |
| JP | H08-324755 A | 12/1996 |
| JP | H11-254367 A | 9/1999 |
| JP | 2002-234615 A | 8/2002 |
| JP | 2005-342860 A | 12/2005 |
| JP | 2013-000855 A | 1/2013 |
| JP | 2013-000861 A | 1/2013 |
| JP | 2013-173196 A | 9/2013 |
| JP | 2014-104530 A | 6/2014 |
| JP | 2016-043424 A | 4/2016 |
| JP | 2017-074637 A | 4/2017 |
| JP | 2017-094407 A | 6/2017 |
| WO | WO-2010141300 A2 | 12/2010 |

OTHER PUBLICATIONS

The State Intellectual Property Office of the People's Republic of China; First Office Action for Chinese Patent Application No. 201810920895.9; dated Dec. 4, 2019; 5 pages.

Liebschner, Mario; Office Action for German Patent Application No. 102018122927.5; dated Apr. 24, 2020; 5 pages.

* cited by examiner

ROBOT SYSTEM

CROSS-REFERENCE TO RELATED APPLICATIONS

This application claims the benefit of Japanese Patent Application No. 2017-185688, the content of which is incorporated herein by reference.

TECHNICAL FIELD

The present invention relates to a robot system, and more particularly, to a robot system for aligning a phase of a workpiece being conveyed with a predetermined phase.

BACKGROUND ART

Conventionally, there is known a robot system which acquires an image of a workpiece being conveyed by a conveying device, detects a phase of the workpiece based on the image, and aligns the phase of the workpiece with a predetermined phase by a robot (for example, see PTLs 1 to 3). The robot includes a hand for holding the workpiece, and a wrist for rotating the hand, and the phase of the workpiece held by the hand can be adjusted by rotation of the wrist.

In the robot systems of PTLs 1 and 2, two robots are associated with different phase ranges and each robot is caused to perform a workpiece phase alignment operation with respect to a corresponding phase to thereby limit the amount of rotation of a wrist of each robot to within ±90°, so as to increase the speed of the phase alignment operation.

CITATION LIST

Patent Literature

{PTL 1} Japanese Unexamined Patent Application, Publication No. 2013-000855
{PTL 2} Japanese Unexamined Patent Application, Publication No. 2013-000861
{PTL 3} Japanese Unexamined Patent Application, Publication No. 2013-173196

SUMMARY OF INVENTION

Solution to Problem

An aspect of the present invention is a robot system including a workpiece phase detection unit that detects a phase of a workpiece around an axis in a substantially vertical direction; a robot including a hand that holds the workpiece, and a wrist capable of rotating the hand around a rotation axis in the substantially vertical direction; and a control unit that controls the robot based on the phase of the workpiece detected by the workpiece phase detection unit, in such a way that the workpiece is picked by the hand and the phase of the workpiece held by the hand is aligned with a predetermined target phase by rotation of the wrist, wherein the control unit controls the robot in such a way that the hand holds and picks the workpiece in a reference phase, among a plurality of predetermined reference phases, closest to a current relative phase of the hand and the workpiece.

DESCRIPTION OF EMBODIMENTS

Hereinafter, a robot system 10 according to an embodiment of the present invention will be described with reference to the drawings.

Figure 1:
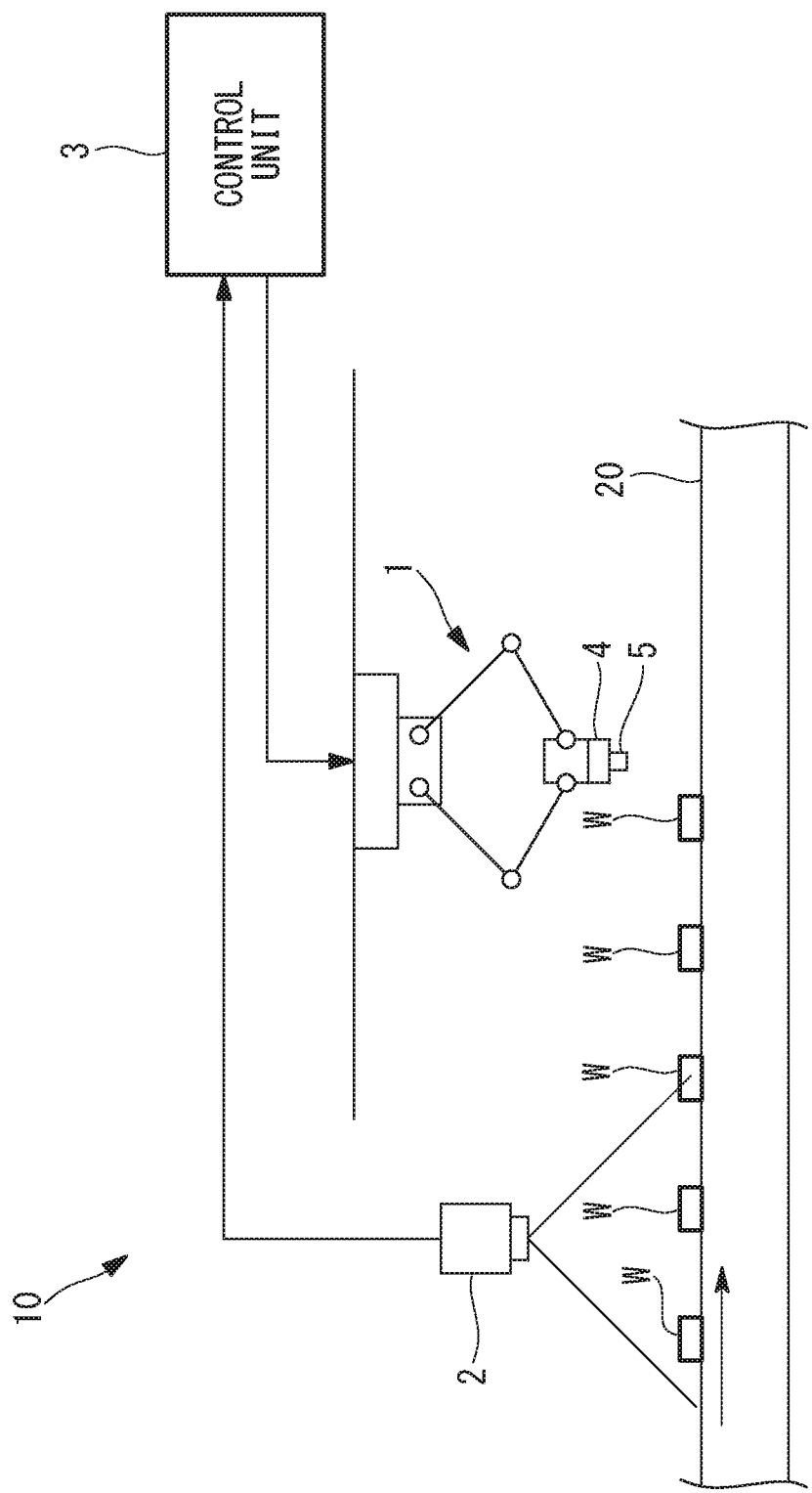
FIG. 1 is an overall configuration diagram of a robot system according to an embodiment of the present invention.

The robot system 10 according to the present embodiment is a visual tracking system which performs phase alignment of workpieces W by a robot 1 while tracking the workpieces W by a camera 2. The workpieces W are being continuously conveyed in a substantially horizontal direction by a conveyor 20. As shown in FIG. 1, the robot system 10 includes the robot 1 installed near the conveyor 20, the camera (workpiece phase detection unit) 2 installed on an upstream side of the robot 1 in a conveying direction, and a control unit 3 that controls the robot 1 based on an image acquired by the camera 2. In FIG. 1, the conveying direction of the conveyor 20 is a direction from a left side to a right side.

Figure 2:
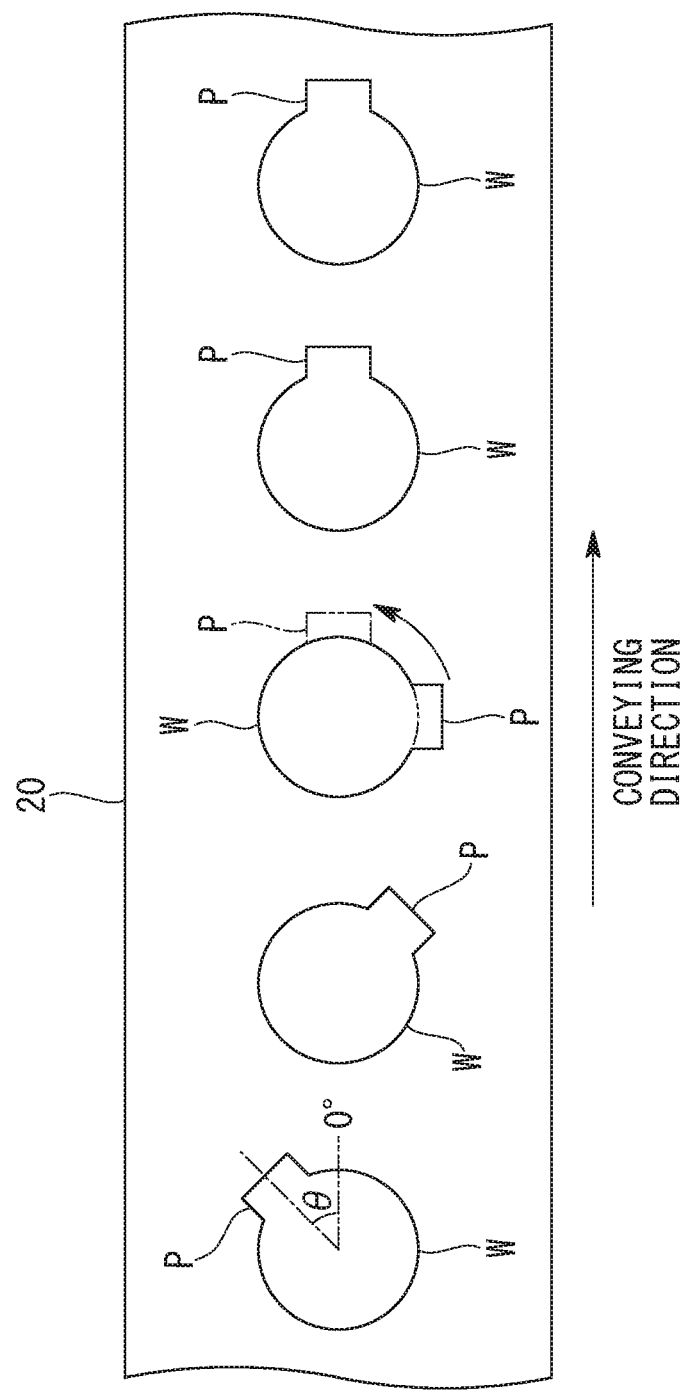
FIG. 2 is a plan view showing workpieces being conveyed on a conveyor.

As shown in FIG. 2, the workpieces W are lined up on the conveyor 20 with gaps in the conveying direction, and are conveyed in one direction by the conveyor 20 from an upstream side to a downstream side. The workpiece W has a shape with an orientation around an axis in a substantially vertical direction, in a state of being placed substantially horizontally on the conveyor 20. The workpiece W shown in FIG. 2 is a substantially disk-shaped member, and a protrusion P protruding radially outwardly from a side surface is provided at a part in a circumferential direction. The workpieces W are supplied onto the conveyor 20 on the upstream side, with various phases G.

Figure 3:
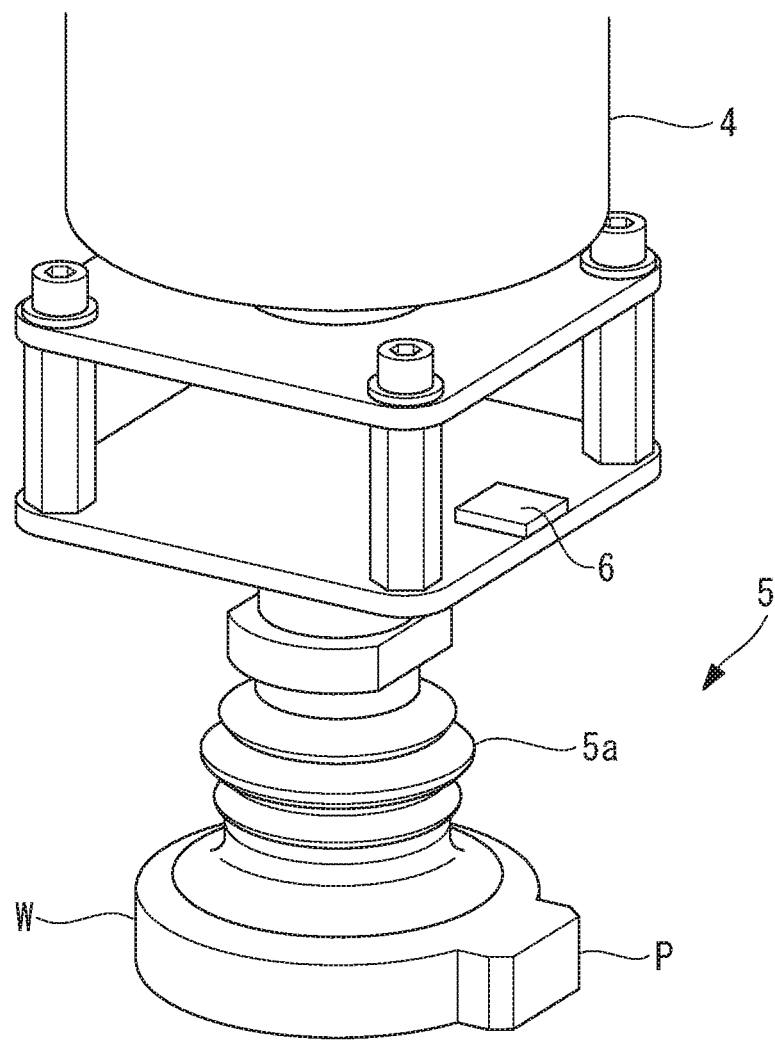
FIG. 3 is a perspective view showing, in a 0°-picking operation, a state where a workpiece is being held by a hand in a relative phase of 0°.
Figure 4:
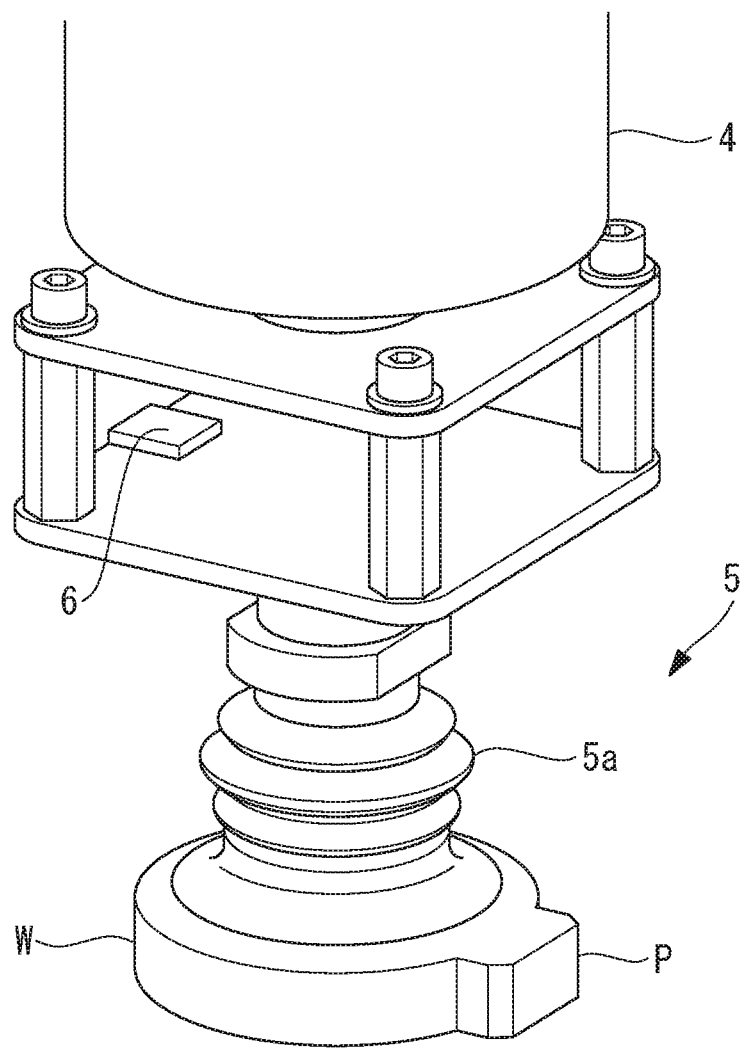
FIG. 4 is a perspective view showing, in a 180°-picking operation, a state where a workpiece is being held by the hand in a relative phase of 180°.

The robot 1 includes a wrist 4 which is capable of rotating around a rotation axis in a substantially vertical direction, and a hand 5 which is fixed to a lower end of the wrist 4 and which is capable of holding the workpiece W. As shown in FIGS. 3 and 4, the hand 5 is configured to hold the workpiece W by a suction pad 5a sticking to an upper surface of the workpiece W. As the robot 1, any type of robot such as a horizontal mounting type or a ceiling mounting type may be used. In the present embodiment, a parallel link robot which is capable of picking the workpiece W at a high speed is assumed.

A rotatable range of the wrist 4 is −360° or more and +360° or less, for example. When the wrist 4 is rotated, the hand 5 is rotated around the rotation axis, and a phase of the hand 5 around the rotation axis is changed. For the phase of the hand 5, a phase in which a marker 6 provided on the hand 5 faces the downstream side of the conveyor 20 is defined as 0°, and a range of phases that can be taken by the hand 5 is −180° or more and +180° or less.

The camera 2 is fixed above the conveyor 20 facing downward, and has a field of view which is fixed to a partial region on the conveyor 20 in the conveying direction. The camera 2 acquires a two-dimensional image capturing, from above, the workpiece W being conveyed on the conveyor 20, and transmits the acquired image to the control unit 3.

The control unit (workpiece phase detection unit) 3 recognizes the workpiece W in the image acquired by the camera 2, by a known image recognition method such as pattern matching, and detects the phase of the recognized workpiece W around a substantially vertical axis. As shown in FIG. 2, for a phase θ of the workpiece W, a phase in which the protrusion P faces the downstream side of the conveyor 20 is defined as 0°, and a range of phases that can be taken by the workpiece W is −180° or more and +180° or less.

Next, the control unit 3 causes the robot 1 to perform a phase alignment operation for the workpiece W, the phase of which is detected, according to an operation program which is taught in advance. Specifically, the control unit 3 causes the robot 1 to perform an operation of picking the workpiece W from the conveyor 20 by the hand 5, aligning the phase of the workpiece W with a predetermined target phase by rotation of the wrist 4, and returning the workpiece W to the conveyor 20.

Here, the control unit 3 acquires a current phase of the hand 5 based on a current rotation angle of the wrist 4, and controls the robot 1 based on the phase of the workpiece W detected from the image and the current phase of the hand 5, such that the hand 5 holds and picks the workpiece W in a reference phase closest to a current relative phase of the workpiece W and the hand 5, among a plurality of predetermined reference phases. The plurality of reference phases are phases obtained by equally dividing a range of relative phases (−180° to +180°) that can be taken by the hand 5 with respect to the workpiece W.

Such a control unit 3 is configured of a computer including a processor such as a CPU (central processing unit) and a memory storing an image processing program and an operation program, for example. That is, when the processor performs processing according to the image processing program, the phase of the workpiece W is detected from an image acquired by the camera 2, and when the processor subsequently performs processing according to the operation program, the robot 1 is caused to perform the phase alignment operation for the workpiece W.

Next, with respect to the action of the robot system 10, a case where two reference phases of 0° and 180° are set in the control unit 3 will be described as an example.

With the robot system 10 according to the present embodiment, the workpiece W supplied on the conveyor 20 on the upstream side is conveyed by the conveyor 20 in one direction toward the downstream side, and is captured by the camera 2 at the time of passing through the field of view of the camera 2, and the acquired image is transmitted to the control unit 3.

Figure 5:
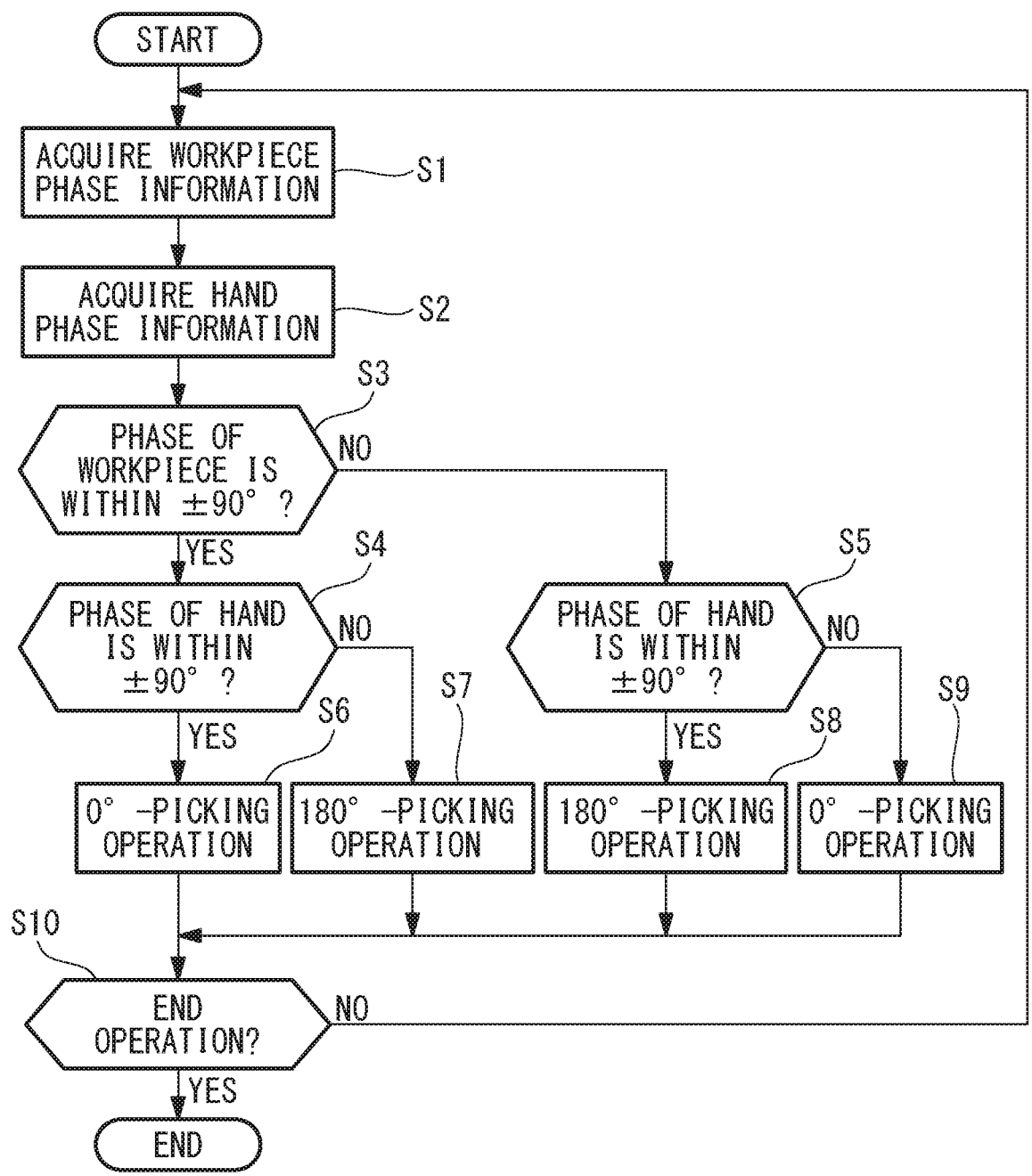
FIG. 5 is a flowchart showing a phase alignment operation for a workpiece by the robot system in FIG. 1.

As shown in FIG. 5, the control unit 3 recognizes the workpiece W in the image by an image processing, and detects the phase of the workpiece W (step S1). The control unit 3 also acquires information about the current phase of the hand 5 (step S2).

Next, the control unit 3 determines which of a 0°-picking operation and a 180°-picking operation is to be performed by the robot 1, based on the phase of the workpiece W and the current phase of the hand 5 (steps S3 to S5).

That is, in the case where both the phase of the workpiece W and the phase of the hand 5 are within ±90° (YES in step S3, and YES in step S4), or in the case where neither the phase of the workpiece W nor the phase of the hand 5 is within ±90° (NO in step S3, and NO in step S5), the control unit 3 causes the robot 1 to perform the 0°-picking operation (steps S6, S9).

In the 0°-picking operation in steps S6, S9, the control unit 3 rotates the wrist 4 until the relative phase of the hand 5 with respect to the phase of the workpiece W becomes 0°, as shown in FIG. 3. The amount of rotation of the wrist 4 at this time is within ±90°. Next, the control unit 3 causes the robot 1 to hold the workpiece W by the hand 5, pick the workpiece W by lifting the hand 5, match the phase of the workpiece W with a predetermined target phase by rotating the wrist 4, and place the workpiece W on the conveyor 20 by lowering the hand 5 and causing the hand 5 to release the workpiece W.

On the other hand, in the cases where one of the phase of the workpiece W and the phase of the hand 5 is within ±90° and the other is not within ±90° (YES in step S3, and NO in step S4; or NO in step S3, and YES in step S5), the control unit 3 causes the robot 1 to perform the 180°-picking operation (steps S7, S8).

In the 180°-picking operation in steps S7, S8, the control unit 3 rotates the wrist 4 until the relative phase of the hand 5 with respect to the phase of the workpiece W becomes 180°, as shown in FIG. 4. The amount of rotation of the wrist 4 at this time is within ±90°. Next, the control unit 3 causes the robot 1 to hold the workpiece W by the hand 5, pick the workpiece W by lifting the hand 5, match the phase of the workpiece W with a predetermined target phase by rotating the wrist 4, and place the workpiece W on the conveyor 20 by lowering the hand 5 and causing the hand 5 to release the workpiece W.

The robot system 10 performs steps S1 to S9 every time a workpiece W is captured by the camera 2 (step S10), and thereby performs phase alignment sequentially for the workpieces W being conveyed by the conveyor 20.

As described above, according to the present embodiment, a plurality of reference phases 0°, 180° are set for the relative phase of the hand 5 with respect to the workpiece W in the workpiece W picking operation, and the reference phase 0° or 180° closest to the current relative phase of the workpiece W and the hand 5 is adopted. Accordingly, there can be achieved advantageous effects that the amount of rotation of the wrist 4 necessary to align the phase of the hand 5 with respect to the workpiece W can be limited, a cycle time required for phase alignment of one workpiece W can be reduced, and phase alignment can be performed also for the workpiece W which is being conveyed at a high speed.

In the present embodiment, for the picking operation of the workpiece W, teaching of operation for the robot 1 may be performed in such a way that the relative phase of the hand 5 with respect to the workpiece W is selected from three or more reference phases. Also in this case, the three or more reference phases are preferably set by equally dividing the range of the relative phases that can be taken by the hand 5 with respect to the workpiece W.

Furthermore, in order to enable the hand 5 to perform the workpiece W picking operation in an arbitrary relative phase, all the relative phases that can be taken by the hand 5 with respect to the workpiece W may be set as the predetermined reference phases. In this case, the control unit 3 controls the robot 1 in such a way that the hand 5 holds and picks the workpiece W in a current phase. Rotation of the wrist 4, in the picking operation, for aligning the phase of the hand 5 with respect to the workpiece W becomes therefore unnecessary, and the cycle time required for phase alignment of one workpiece W can be further reduced.

In the case of performing the workpiece W picking operation by the hand 5 without rotating the wrist 4 as described above, the rotation angle of the wrist 4 possibly nears a stroke limit (−360° or +360°) while the phase alignment operations for the workpieces W are repeatedly performed. Accordingly, the control unit 3 may control rotation of the wrist 4 so that the rotation angle of the wrist 4 does not reach the stroke limit.

A gap between the workpieces W on the conveyor 20 may be grasped by using the camera 2 located on the upstream side of the robot 1. Accordingly, for example, the control unit 3 may rotate the wrist 4 in a direction of the rotation angle nearing 0°, at a timing of a large gap between the workpieces W. Alternatively, the control unit 3 may rotate the wrist 4, in the workpiece W picking operation, in a direction of the rotation angle nearing 0°, in a case where the rotation angle of the wrist 4 exceeds a predetermined angle.

In the present embodiment, a hand 5 of a suction type is used to hold the workpiece W, but the type of the hand 5 is not limited thereto, and a hand 5 of any type may be used as long as holding and release of the workpiece W can be performed. For example, a magnet-type hand for holding the workpiece W by a magnetic force, or a chuck-type hand for grasping the workpiece W with a plurality of fingers may be used. Note that the hand 5 is desirably capable of holding the workpiece W regardless of the relative phase of the workpiece W and the hand 5.

In the present embodiment, a description is given of a visual tracking system wherein workpieces W which are continuously conveyed by the conveyor 20 are tracked by the camera 2, and picking of the workpieces W is performed by the robot 1, but the robot system 10 may be another type of system. For example, in the case where the workpieces W are pitch-fed by the conveyor 20, the robot system 10 may perform acquisition of an image by the camera 2 and phase alignment by the robot 1 while the workpiece W are not moving.

Furthermore, the robot system 10 according to the present embodiment may be applied to picking of bulk workpieces W.

From the above-described embodiment, the following invention is derived.

An aspect of the present invention is a robot system including a workpiece phase detection unit that detects a phase of a workpiece around an axis in a substantially vertical direction; a robot including a hand that holds the workpiece, and a wrist capable of rotating the hand around a rotation axis in the substantially vertical direction; and a control unit that controls the robot based on the phase of the workpiece detected by the workpiece phase detection unit, in such a way that the workpiece is picked by the hand and the phase of the workpiece held by the hand is aligned with a predetermined target phase by rotation of the wrist, wherein the control unit controls the robot in such a way that the hand holds and picks the workpiece in a reference phase, among a plurality of predetermined reference phases, closest to a current relative phase of the hand and the workpiece.

According to the present aspect, the workpiece is picked by the hand, and the phase of the workpiece is aligned with the predetermined target phase by rotation of the wrist by the amount of rotation that is based on the phase of the workpiece detected by the workpiece phase detection unit.

In this case, the relative phase of the hand and the workpiece at the time of picking the workpiece by the hand can be selected from a plurality of reference phases, and the control unit selects the reference phase closest to the current relative phase of the hand and the workpiece. The amount of rotation of the wrist in a workpiece picking operation can thereby be limited, and a cycle time required for phase alignment of one workpiece can be reduced.

In the aspect described above, the plurality of predetermined reference phases may be phases obtained by equally dividing a range of a relative phase of the hand with respect to the workpiece.

The amount of rotation of the wrist in the workpiece picking operation can thus be limited more effectively.

In the aspect described above, the workpiece phase detection unit may include a camera that acquires an image of the workpiece, and the phase of the workpiece may be detected based on the image acquired by the camera.

The phase of the workpiece can thus be detected by a simple processing.

In the aspect described above, the hand may hold the workpiece by suction.

A suction-type hand can hold the workpiece in any phase, and thus, the reference phase can be set to an arbitrary phase. Moreover, compared to a chuck-type hand which grasps a workpiece with a plurality of fingers, holding and release of the workpiece can be performed more rapidly, and the cycle time required for phase alignment of one workpiece can be further reduced.

REFERENCE SIGNS LIST 1 robot
2 camera (workpiece phase detection unit)
3 control unit (workpiece phase detection unit)
4 wrist
5 hand
5a suction pad
10 robot system
W workpiece

The invention claimed is:

1. A robot system comprising:
a robot including a hand that holds a workpiece, and a wrist capable of rotating the hand around a rotation axis in a substantially vertical direction; and
a control unit that controls the robot so as to rotate the wrist to pick up the workpiece by the hand,
wherein the control unit comprises a processor configured to:
detect a phase of the workpiece around an axis in the substantially vertical direction;
acquire a current phase of the hand based on a current rotation angle of the wrist;
select, based on the acquired current phase of the hand and the detected phase of the workpiece, any one of a plurality of reference phases previously set for a relative phase of the hand with respect to the phase of the workpiece; and
control the robot so as to rotate the wrist until the relative phase becomes the selected reference phase to pick up the workpiece by the hand.

2. The robot system according to claim 1, further comprising a camera that acquires an image of the workpiece, wherein the processor is configured to detect the phase of the workpiece based on the image acquired by the camera.

3. The robot system according to claim 1, wherein the hand holds the workpiece by suction.

4. The robot system according to claim 1, wherein the plurality of reference phases comprise two reference phases of 0° and 180°, and the processor is configured to select one of the two reference phases based on whether or not the acquired current phase of the hand and the detected phase of the workpiece are within ±90°.

* * * * *